United States Patent
Jeon et al.

(10) Patent No.: US 10,277,667 B2
(45) Date of Patent: Apr. 30, 2019

(54) METHOD AND APPARATUS FOR EXECUTING APPLICATION BASED ON OPEN COMPUTING LANGUAGE

(71) Applicants: Samsung Electronics Co., Ltd., Gyeonggi-do (KR); SNU R&DB Foundation, Seoul (KR)

(72) Inventors: Cheolyong Jeon, Seoul (KR); Jaejin Lee, Seoul (KR); Hongjune Kim, Seoul (KR); Jun Lee, Seoul (KR)

(73) Assignees: Samsung Electronics Co., Ltd (KR); SNU R&DB Foundation (KR)

( * ) Notice: Subject to any disclaimer, the term of this patent is extended or adjusted under 35 U.S.C. 154(b) by 246 days.

(21) Appl. No.: 14/853,405

(22) Filed: Sep. 14, 2015

(65) Prior Publication Data

US 2016/0080284 A1    Mar. 17, 2016

(30) Foreign Application Priority Data

Sep. 12, 2014   (KR) ........................ 10-2014-0121379

(51) Int. Cl.

| | |
|---|---|
| *G06F 15/173* | (2006.01) |
| *H04L 29/08* | (2006.01) |
| *G06F 8/30* | (2018.01) |
| *G06F 9/44* | (2018.01) |
| *G06F 9/445* | (2018.01) |
| *G06F 9/50* | (2006.01) |
| *H04W 4/60* | (2018.01) |

(52) U.S. Cl.
CPC ............... *H04L 67/10* (2013.01); *G06F 8/30* (2013.01); *G06F 9/44* (2013.01); *G06F 9/445* (2013.01); *G06F 9/50* (2013.01); *H04W 4/60* (2018.02); *Y02D 10/43* (2018.01)

(58) Field of Classification Search
CPC ... G06F 9/44; G06F 9/445; G06F 9/50; G06F 9/5044; H04L 67/10; Y02B 60/185
See application file for complete search history.

(56) References Cited

U.S. PATENT DOCUMENTS

| | | | | |
|---|---|---|---|---|
| 9,654,414 | B2* | 5/2017 | Chatterjee | ............... H04L 47/70 |
| 9,853,834 | B2* | 12/2017 | Meier | ...................... H04L 12/66 |
| 2004/0098718 | A1* | 5/2004 | Yoshii | .................... G06F 9/5033 718/100 |
| 2006/0085786 | A1* | 4/2006 | Hayhow | ............... G06F 9/5033 718/100 |
| 2010/0095152 | A1* | 4/2010 | Darrington | ......... G06F 11/1438 714/19 |
| 2010/0169861 | A1* | 7/2010 | Wang | ...................... G06F 8/443 717/110 |

(Continued)

*Primary Examiner* — Shean Tokuta
(74) *Attorney, Agent, or Firm* — The Farrell Law Firm, P.C.

(57) ABSTRACT

Disclosed is a method of executing a kernel of a mobile application program using an open computing language (OpenCL). The method includes receiving, from a server, a resource list including resources to execute a kernel for the application program; determining, if the application program is executed, resources to execute the kernel for the application program among resources of the terminal and the server; and transmitting, if the resources to execute the kernel are determined as the resources of the server, data and the kernel to the server.

10 Claims, 10 Drawing Sheets

(56) References Cited

U.S. PATENT DOCUMENTS

| | | | |
|---|---|---|---|
| 2010/0228861 A1* | 9/2010 | Arsovski | G06F 9/5027 709/226 |
| 2010/0269111 A1* | 10/2010 | Conte | G06Q 10/06 718/100 |
| 2011/0040417 A1* | 2/2011 | Wolfe | G06F 1/206 700/291 |
| 2011/0103393 A1* | 5/2011 | Meier | H04L 12/66 370/401 |
| 2011/0161495 A1* | 6/2011 | Ratering | G06F 9/5044 709/226 |
| 2011/0231440 A1† | 9/2011 | Vlaovic et al. | |
| 2011/0282982 A1* | 11/2011 | Jain | G06F 9/5094 709/223 |
| 2011/0310977 A1* | 12/2011 | Nishihara | G06F 9/4881 375/240.24 |
| 2012/0109936 A1* | 5/2012 | Zhang | G06F 17/30312 707/713 |
| 2012/0130554 A1* | 5/2012 | Jain | G06F 1/329 700/291 |
| 2012/0131591 A1* | 5/2012 | Moorthi | G06Q 10/06 718/104 |
| 2012/0137002 A1† | 5/2012 | Ferris et al. | |
| 2012/0158447 A1* | 6/2012 | Jain | G06Q 10/06311 705/7.15 |
| 2012/0284073 A1* | 11/2012 | Agarwal | G06Q 10/101 705/7.13 |
| 2013/0016110 A1* | 1/2013 | Arvo | G06F 9/4881 345/522 |
| 2013/0031550 A1* | 1/2013 | Choudhury | G06F 9/45558 718/1 |
| 2013/0191843 A1* | 7/2013 | Sarkar | G06F 9/505 718/105 |
| 2014/0149752 A1* | 5/2014 | Brock | G06F 1/3206 713/300 |
| 2014/0172971 A1* | 6/2014 | Akkurt | H04L 67/1029 709/204 |
| 2014/0229026 A1* | 8/2014 | Cabrini | G06Q 50/06 700/291 |
| 2014/0297405 A1* | 10/2014 | Fine | G06F 11/3419 705/14.53 |
| 2014/0344822 A1* | 11/2014 | Kini | G06F 9/5038 718/103 |
| 2014/0359126 A1* | 12/2014 | Breternitz | H04L 47/70 709/226 |
| 2015/0039922 A1† | 2/2015 | Chalhoub et al. | |
| 2015/0100971 A1* | 4/2015 | Dube | G06F 9/4881 719/319 |
| 2015/0170318 A1* | 6/2015 | Gould | G06T 1/20 345/505 |
| 2015/0205588 A1* | 7/2015 | Bates | G06F 9/4552 717/145 |
| 2015/0227466 A1* | 8/2015 | Kyo | G06F 9/5016 711/122 |
| 2015/0316904 A1* | 11/2015 | Govindaraj | G05B 13/0205 700/28 |
| 2015/0348225 A1* | 12/2015 | Schreyer | G06T 1/20 345/522 |
| 2017/0090989 A1* | 3/2017 | van Velzen | G06F 9/5038 |

\* cited by examiner
† cited by third party

US 10,277,667 B2

METHOD AND APPARATUS FOR EXECUTING APPLICATION BASED ON OPEN COMPUTING LANGUAGE

PRIORITY

This application claims priority under 35 U.S.C. § 119(a) to Korean Patent Application No. 10-2014-0121379, filed in the Korean Intellectual Property Office on Sep. 12, 2014, the contents of which are incorporated herein by reference.

BACKGROUND

1. Field of the Invention

The present disclosure relates generally to an open universal parallel computing framework, and more particularly, to a method and an apparatus for executing an application based on an open computing language.

2. Description of the Related Art

A local device directly used by a user may have limitations on tasks that it can perform, due to limited computing capability or power resources. Particularly, a mobile device is largely limited in terms of hardware capability for the sake of portability. Accordingly, one of the methods for solving the restrictions on tasks that can be performed, is to transfer a workload to be processed to an external high performance device. For example, a cloud service provides a computing system in which an input or output operation is mainly performed through a user terminal and operations such as information analysis, processing, storage, management and circulation are performed in a third space called a cloud. Through the use of such a service, plentiful computing resources may be provided at a relatively low cost, rendering the service as a proper alternative to cure some of the aforementioned limitations of the mobile device. However, it is difficult for the cloud service to allow a general programmer to use such a task transferring scheme due to the nonexistence of an integrated programming model capable of using the service and a development environment.

More specifically, a high level of technology is required in order to transfer the task, which has been performed in the local device, to an external service and to perform the transferred task. Because of incompatibility of instruction set architecture (ISA) between different devices, a new program suitable for each device should be made and a program that transfers a task to an external device, performs the task, and collects and receives results should be developed. In addition, it is required to determine which task is suitable to be transferred to the external device and, when the type of external device or local device changes, a new analysis of suitability of the changed type must be performed.

SUMMARY

The present invention has been made to address the above-mentioned problems and disadvantages, and to provide at least the advantages described below.

Accordingly, an aspect of the present invention is to provide a scheme of transferring a task to an internal or external device according to a user preference through a programming model using an open computing language (OpenCL).

According to another aspect of the present disclosure, support is provided to automatically select an external device such as a mobile device or a server, or an effective device among the mobile device and server, with respect to an application program written in an OpenCL according to a user's selection, to execute the application program, and to selectively transfer only a part suitable to be remotely performed through performance analysis based on a cost model, so as to promote optimal performance and energy efficiency.

In accordance with an aspect of the present disclosure, a method of executing an application program by a terminal includes receiving, from a server, a resource list including resources to execute a kernel for the application program; determining, if the application program is executed, resources to execute the kernel for the application program among resources of the terminal and the server; and transmitting, if the resources to execute the kernel are determined as the resources of the server, data and the kernel to the server.

In accordance with another aspect of the present disclosure, a terminal for executing an application program includes a communication unit configured to transmit and receive information; and a controller configured to receive, from a server, a resource list including resources to execute a kernel for the application program, determine, if the application program is executed, resources to execute the kernel for the application program among resources of the terminal and the server, and transmit, if the resources to execute the kernel are determined as the resources of the server, data and the kernel to the server.

BRIEF DESCRIPTION OF THE DRAWINGS

The above and other aspects, features and advantages of the present disclosure will be more apparent from the following detailed description in conjunction with the accompanying drawings, in which.

DETAILED DESCRIPTION OF EMBODIMENTS OF THE DISCLOSURE

Figure 1:
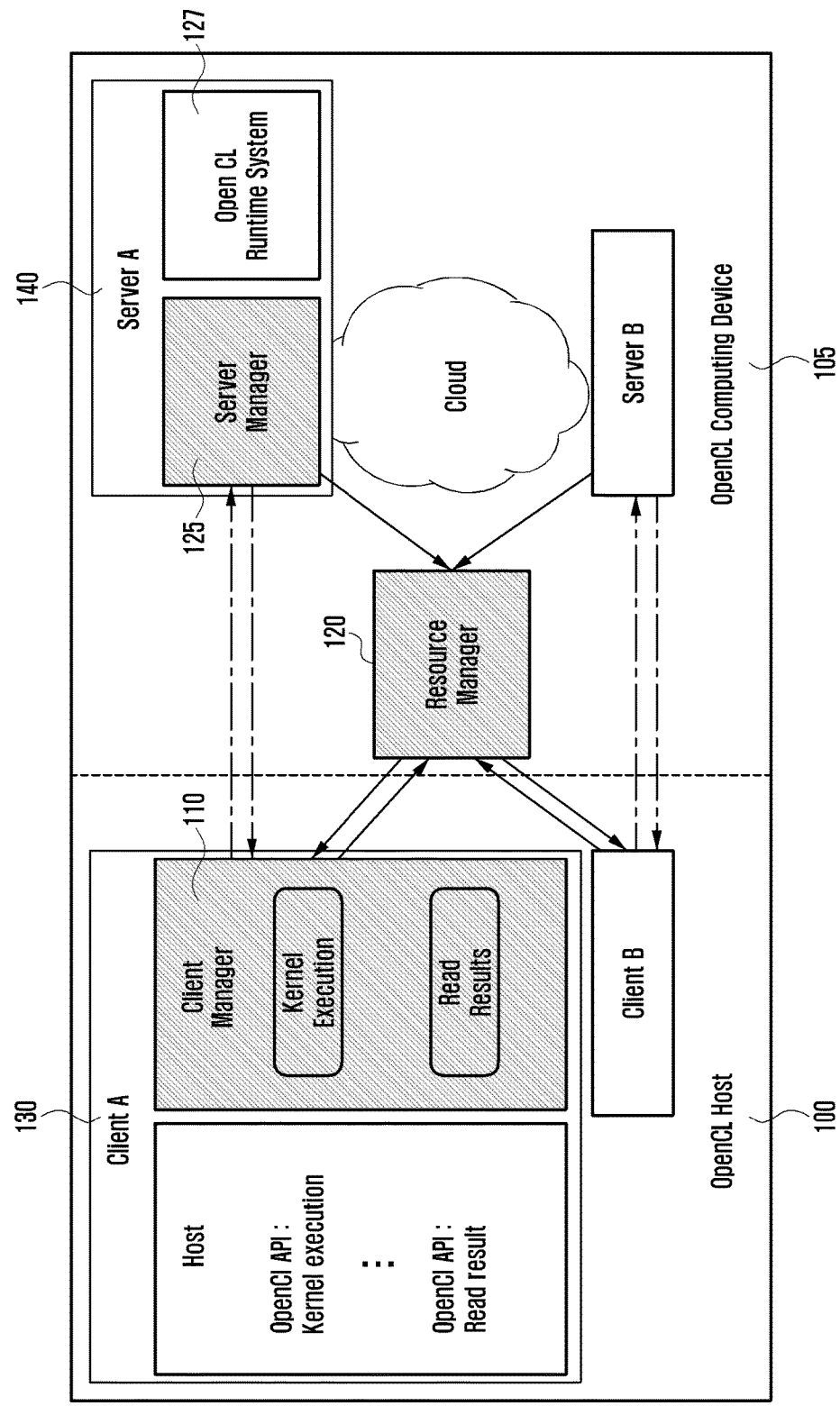
FIG. 1 illustrates a total configuration of an application execution system based on an OpenCL according to an embodiment of the present disclosure.

Embodiments of the present disclosure will be described in detail with reference to the accompanying drawings. A description of technical matters well-known in the art and not directly associated with the present disclosure will be omitted for the sake of clarity and conciseness.

In addition, some elements may be exaggerated, omitted, or schematically illustrated in the accompanying drawings, and the size of each element does not completely reflect the actual size thereof. In the respective drawings, the same or corresponding elements are provided with the same reference numerals.

The advantages and features of the present disclosure and methods to achieve the same will be apparent when reference is made to embodiments as described below in detail in conjunction with the accompanying drawings. However, the present disclosure is not limited to the embodiments set forth below, but may be implemented in various different forms. The following embodiments are provided in an effort to completely disclose the present disclosure and inform those skilled in the art of the scope of the present disclosure, which is defined only by the appended claims. Throughout the specification, the same or like reference signs are used to designate the same or like elements.

A terminal of the present specification may be a device including a Central Processing Unit (CPU) and a storage unit, such as a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device including a head-mounted-device (HMD) such as electronic glasses, electronic clothes, an electronic bracelet, an electronic necklace, an electronic appcessory, an electronic tattoo, and a smart watch.

The terminal of the present specification may also be a smart home appliance including a CPU and a storage unit, such as a television, a digital video disk (DVD) player, an audio player, a refrigerator, an air conditioner, a cleaner, an oven, a microwave oven, a washing machine, an air purifier, a set-top box, a TV box such as Samsung HomeSync™, Apple TV™, or Google TV™, a game console, an electronic dictionary, an electronic key, a camcorder, or an electronic frame.

According to some embodiments, the terminal includes at least one of various medical appliances such as magnetic resonance angiography (MRA), magnetic resonance imaging (MRI), computed tomography (CT), and ultrasonic machines, navigation equipment, a global positioning system (GPS) receiver, an event data recorder (EDR), a flight data recorder (FDR), an automotive infotainment device, electronic equipment for ships such as ship navigation equipment and a gyrocompass, avionics, security equipment, a vehicle head unit, an industrial or home robot, an automatic teller machine (ATM) of a banking system, and a point of sales (POS) device of a shop.

It will be understood that each block of the flowchart illustrations, and combinations of blocks in the flowchart illustrations, can be implemented by computer program instructions provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a non-transitory computer usable or computer-readable memory that can direct a computer or other programmable data processing apparatus to function in a particular manner, such that the instructions stored in the computer usable or computer-readable memory produce an article of manufacture including instructions that implement the function specified in the flowchart. The computer program instructions may also be loaded onto a computer or other programmable data processing apparatus to cause a series of operational steps to be performed on the computer or other programmable apparatus to produce a computer implemented process such that the instructions that are executable on the computer or other programmable apparatus provide steps for implementing the functions specified in the flowchart.

Each block of the flowchart illustrations may represent a module, segment, or portion of code, which includes one or more executable instructions for implementing the specified logical function(s). In some alternative implementations, the functions noted in the blocks may occur out of the order illustrated. For example, two blocks shown in succession may in fact be executed substantially concurrently or in reverse order, depending upon the functionality involved.

As used herein, the terms "unit" or "module" refer to a software element or a hardware element, such as a field programmable gate array (FPGA) or an application specific integrated circuit (ASIC), which performs a predetermined function. However, the "unit" or "module" does not always have a meaning limited to software or hardware, and may be constructed either to be stored in an addressable storage medium or to execute one or more processors. Therefore, the terms "unit" or "module" include, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements or divided into a larger number of elements. Moreover, the elements and the "units" or "modules" may be implemented to reproduce one or more CPUs within a device or a security multimedia card.

In this specification, a kernel may be a core part of an operating system that performs a function of managing and controlling system hardware, and may refer to controlling hardware resources to operate a function required for driving an application. The kernel may have the same meaning as the term "kernel program", and may control or manage system resources used for executing operations or functions implemented in programming modules, such as middleware, an application programming interface (API), or an application.

In this specification, an OpenCL may be one type of an API that corresponds to an interface made to control a function provided by an operating system or a programming language so as to be used by an application program. More specifically, the OpenCL includes an OpenCL C corresponding to a language based on C99 to write a kernel code and an API for defining and controlling a platform. The OpenCL provides task-based and data-based parallel computing.

According to the present disclosure, a device to execute an OpenCL programming model can be selected according to user preference, and an optimal target to be offloaded can be determined using a cost model.

Since whether to perform offloading is determined herein through automatic kernel analysis, the offloading can be directly applied, even though the type and environment of the server or local device may change. Thus, limitations on performance restrictions can be overcome in various environments.

According to the present disclosure, high energy efficiency is provided when a local device is similar to a battery-dependent mobile device.

FIG. 1 illustrates a configuration of an application execution system based on an OpenCL according to an embodiment of the present disclosure.

Referring to FIG. 1, an OpenCL application includes a kernel program and a host program. The kernel program corresponds to a function executed by a computing device such as a central processing unit (CPU) or a graphic processing unit (GPU), and the host program corresponds to a program operated by a host processor that manages a memory or the kernel program to execute the kernel program.

The present disclosure is applied to a system that is divided into an OpenCL host 100 and an OpenCL computing device 105 according to a basic configuration of the OpenCL as illustrated in FIG. 1, and further includes a client manager 110 in the host for basic operations and a resource manager 120 and a server manager 125 in the computing device.

The resource manager 120 is a process firstly executed when an application is driven and exists in a server. All clients 130 and servers 140 are aware of an address of the resource manager 120 in advance and thus may connect to the resource manager 120 at anytime. Computation devices within the server inform the resource manager 120 of a state of computation resources of each server through the server manager 125.

The client 130, such as a local device, drives an OpenCL application with the client manager 110 and receives desired server resources through the resource manager as necessary. The kernel is automatically analyzed by the client manager and is offloaded to a server node allocated by the resource manager when needed, and the server node executes the kernel through an OpenCL runtime system 127 within the server. A process of collecting read results of the kernel execution performed by the server node and the local device is performed by the client manager 110.

Figure 2:
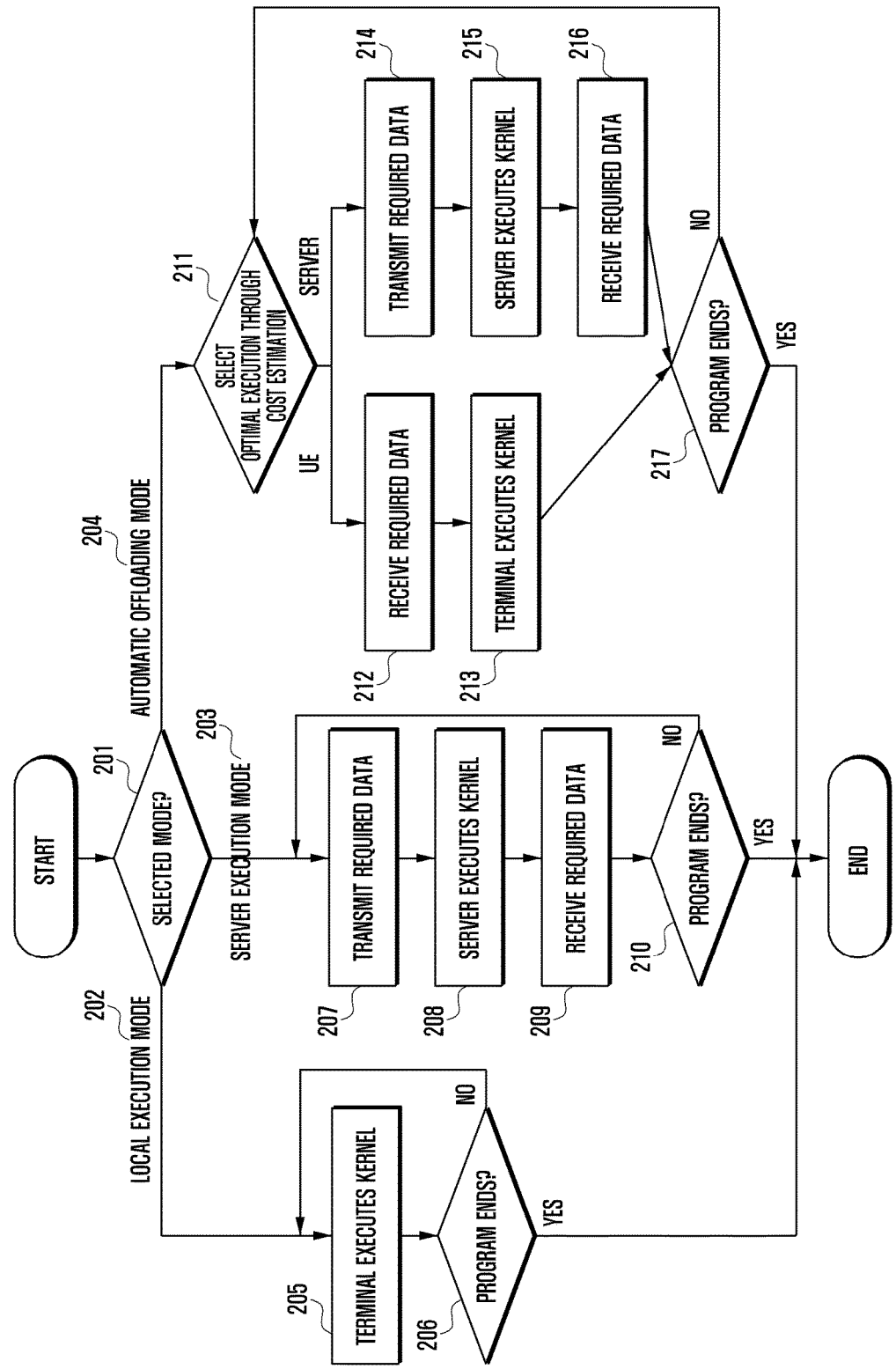
FIG. 2 illustrates an operation of a kernel offloading method according to an embodiment of the present disclosure.

FIG. 2 illustrates an operation of a kernel offloading method according to an embodiment of the present disclosure.

Referring to FIG. 2, when an application is driven, a terminal determines in step 201 whether to execute the kernel in the local device in step 202 in a local execution mode, in the server in step 203 in a server execution mode, or by offloading the kernel according to an automatically preset reference in step 204 in an automatic offloading mode, based on a user's selection or preference. All kernels are executed within the local device (i.e., the terminal) in the local execution mode 202, all kernels are offloaded to the server and executed in the server execution mode 203, and kernels to be offloaded are automatically selected in a framework based on calculation and network capabilities of the terminal and the server and the selected kernels are executed in the automatic offloading mode 204.

The local execution mode 202 corresponds to a type in which the terminal executes all kernels without offloading the kernels, and is selected when there is no limitation on hardware resources of the terminal and there is no restriction on tasks which can be performed. In this case, until the OpenCL application program ends in step 206, the kernels are executed by the terminal in step 205.

In the server execution mode 203, all kernels are offloaded to the server and executed. To this end, information on targets to be offloaded is required. The resource manager renews available server information in a resource management table and, when receiving a request for executing the kernel from the client manager, informs the client manager of suitable server information. The server information includes at least one of calculation or computing performance capability of the server, a state of communication with the server, and energy consumed by a data upload or download to the server. The client manager directly transmits data and the kernel to the corresponding server manager based on the information. The received data and kernel are executed in an OpenCL runtime system on the corresponding server in step 208. Results of the execution are transferred to the client manager which receives the results in step 209, and the process is repeated until the program performance ends in step 210.

In the automatic offloading mode 204, kernels to be offloaded are automatically selected in the framework based on calculation and network capabilities of the terminal and an external device and the kernels are executed by each of the terminal and the server.

An estimated cost of each kernel is used as a reference for determining the kernel executed by the kernel and the terminal in step 211.

A method of estimating the cost will be described below in more detail with reference to FIGS. 3 to 7.

When the kernel to be executed by the terminal or the server is determined in step 211, the corresponding locations transmit and receive required data and kernels in steps 212 and 214, respectively, and the terminal and the server execute the kernels in steps 213 and 215, respectively. The required data, which is the result of the kernel execution performed by the server is received by the terminal in step 216. The process is repeated until the program ends in step 217.

Figure 3:
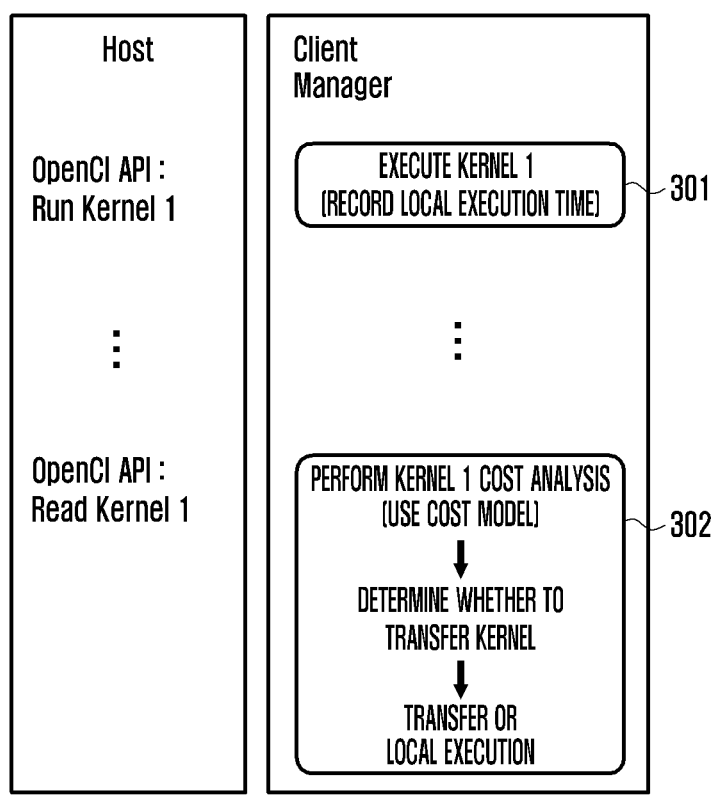
FIG. 3 illustrates cost estimation to determine whether to perform offloading in an automatic offloading mode according to an embodiment of the present disclosure.

FIG. 3 illustrates cost estimation to determine whether to perform offloading in the automatic offloading mode according to an embodiment of the present disclosure.

Referring to FIG. 3, costs are calculated by cost models determined according to Equation (1) and Equation (2) below, and whether to transfer (offload) the kernel to be executed is determined based on the calculated costs. More specifically, referring to FIG. 3, when kernel 1 is first executed, the time for which the kernel is executed by the terminal is recorded as indicated by reference numeral 301. When a cost of kernel 1 is analyzed, the analysis is based on at least one of, for example, a calculation capability of the terminal, a calculation capability of the server node to be allocated, a data transmission time according to a data size and a communication state (bandwidth) used by the kernel, a time for which the kernel to be executed is actually executed by the terminal, and energy consumption when the kernels are executed. That is, through the analysis of the cost of kernel 1, the benefit in transferring the kernel is analyzed according to Equations (1) and (2), as follows. The terminal determines whether to transfer kernel based on the analysis, and transfers or performs local execution based on the determination 302.

$$\text{Cost}_L = T_L * E_C + T_D * E_D \tag{1}$$

$$\text{Cost}_S = T_S * E_I + T_U * E_U \tag{2}$$

In Equations (1) and (2), $Cost_L$ indicates an execution cost calculated by the terminal, and $Cost_S$ indicates an execution cost calculated by the server. $T_L$ and $T_S$ indicate processing time of the corresponding kernels in the terminal and the server, $E_C$ and $E_I$ indicate an energy when the kernel is executed by the terminal and an energy in an idle state, $T_D$ and $T_U$ indicate a data download time and a data upload time based on a communication state, and $E_D$ and $E_U$ indicate energies in data download and upload when data is transmitted.

The execution time of the current kernels is collected based on profiles. In the initial execution, the kernel is executed and the execution time is measured by the terminal. The kernel execution time in each computing device is predicted based on the measured value and a hardware (HW) capability of each computing device. The predicted information is stored in a database file and is then used for later execution.

Figure 4:
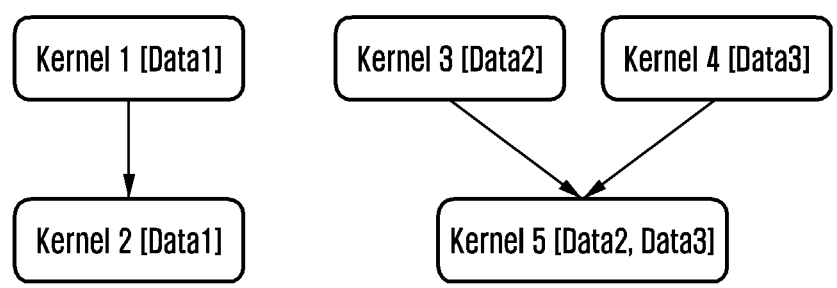
FIG. 4 illustrates a multi-kernel in a method of determining whether to perform offloading according to an embodiment of the present disclosure.

FIG. 4 illustrates a multi-kernel in a method of determining whether to perform offloading according to an embodiment of the present disclosure.

In single-kernel analysis, only a cost model according to a location in which the corresponding kernel is executed is sufficient in the automatic offloading mode of FIG. 3, but a plurality of kernels may exist within one OpenCL program and there may be dependency between the kernels. In this case, a quantity of communication that actually occurs may be changed by the dependency.

In FIG. 4, kernel 1 including data 1 depends on kernel 2 including data 2, and kernel 3 including data 3 and kernel 4 including data 4 depend on kernel 5 including data 5. Accordingly, when data 1 in kernel 1 is executed by the terminal and data 2 in kernel 2 is executed by the server node, data transmission/reception between the two kernels is necessary, which generates transmission time and energy according to the data transmission/reception. Therefore, in the multi-kernel in which a plurality of kernels exists, more accurate analysis is acquired by adding the dependency to the cost analysis.

Figure 5:
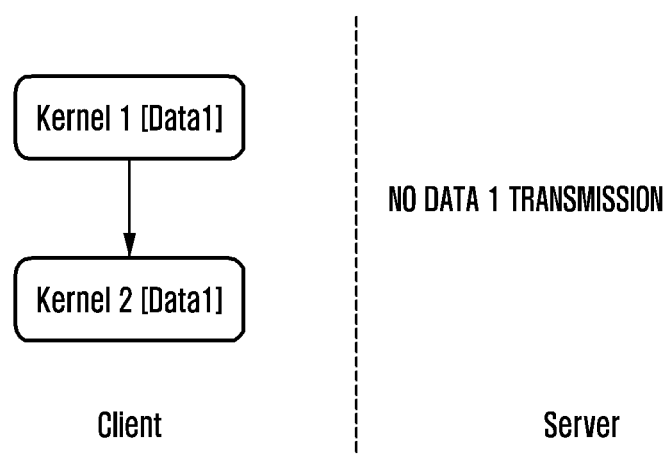
FIG. 5 illustrates when a dependent kernel exists in a local device in a method of determining whether to perform offloading according to an embodiment of the present disclosure.

FIG. 5 illustrates the multi-kernel in which kernels having a dependent relationship therebetween exist in the local device in the method of determining whether to perform offloading according to an embodiment of the present disclosure.

The kernel dependency may be expressed as data dependency between kernels. In the kernel dependency, one kernel may be dependent on several kernels and several kernels may be dependent on one kernel. A communication quantity of dependent data may be determined according to a location in which the dependent kernel is executed. Communication for data transmission is not necessary when dependent kernels are executed in the same location, but is necessary when the dependent kernels are executed in different locations.

Referring to FIG. 5, since kernel 1 including data 1 and kernel 2 including data 2 have a dependent relationship therebetween and both the kernels are executed by the client, data transmission/reception between the client and the server is not necessary.

Figure 6:
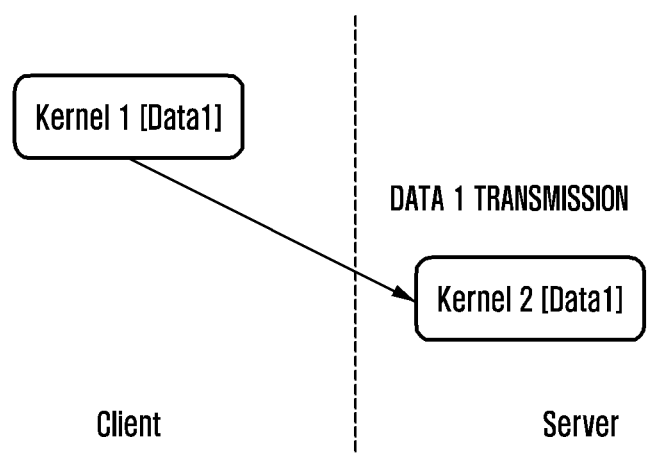
FIG. 6 illustrates when a dependent kernel exists in a server node in a method of determining whether to perform offloading according to an embodiment of the present disclosure.

FIG. 6 illustrates a the multi-kernel in which kernels having a dependent relationship therebetween exist in the local device and the server node in the method of determining whether to perform offloading according to an embodiment of the present disclosure.

In FIG. 6, kernel 1 including data 1 and kernel 2 including data 2 have a dependent relationship therebetween, but kernel 1 including data 1 is executed by the client (i.e., the local device or terminal) and kernel 2 is executed by the server, so that data is transmitted to the server node from the client. Accordingly, in this case, the offloading is determined based on costs of time and energy resources due to the data communication.

Figure 7:
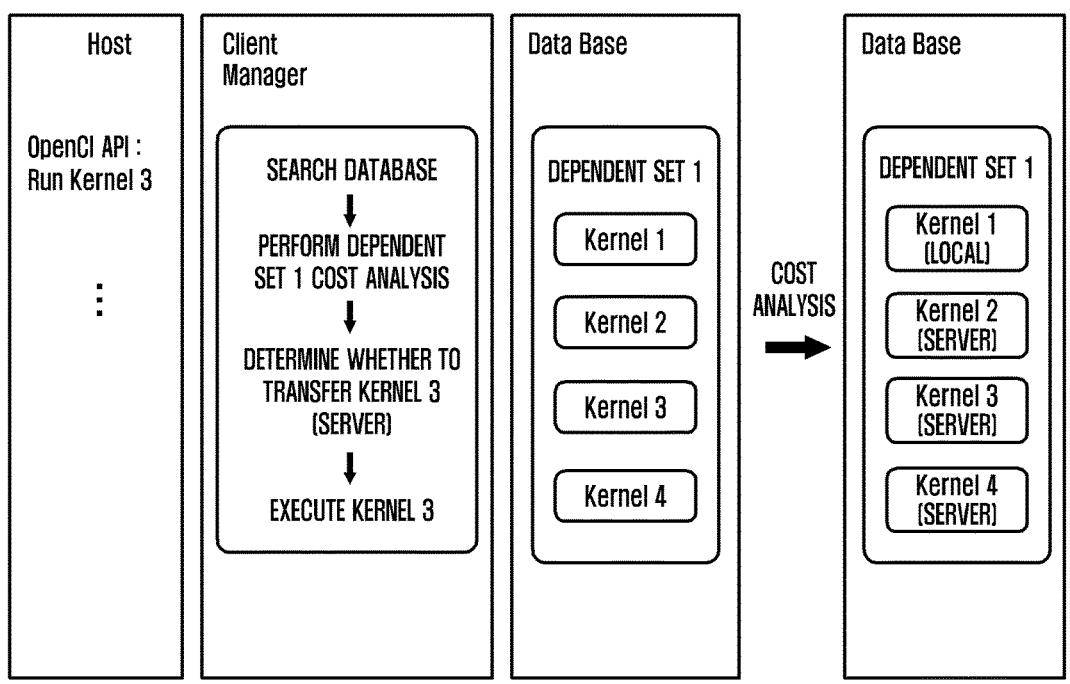
FIG. 7 illustrates an offloading method when a plurality of kernels having a dependent relationship therebetween exist according to an embodiment of the present disclosure.

FIG. 7 illustrates an offloading method when a plurality of kernels having a dependent relationship therebetween exist according to an embodiment of the present disclosure.

When one kernel (kernel 3) is executed and a plurality of kernels dependent on the one kernel exists, current cost analysis of the independent kernel considers relationships with all the dependent kernels in order to reflect costs of offloading of all the dependent kernels to perform optimal offloading. To this end, the client provides all the dependent kernels as one dependent set and uses the dependent set for the cost analysis. If the dependent set is generated once, the dependent set is stored in a database to be used for later cost analysis.

When kernel 3 is executed, a dependent set including the same kernel (kernel 3) is searched for in the database. When the same kernel (kernel 3) does not exist, the cost analysis of the corresponding kernel is performed only using the cost model described in FIG. 2. When the dependent set including the same kernel exists, an optimal location in which the corresponding kernel is executed is analyzed through total cost analysis of the set.

When a dependent set of kernel 1 to kernel 4 is found in the database, it is determined whether to offload each kernel through the cost analysis of each kernel. When it is determined whether to transfer the task through the cost analysis considering the dependency, the client manager transfers the corresponding kernel to the server or executes the kernel by the local device according to the determination. When the location in which the kernel dependent on the current independent kernel is executed is different from the location in which the current kernel will be executed, the client manager moves dependent data to the location in which the independent kernel is executed. When the user desires to identify a result of the kernel execution, the client manager moves the kernel to the local device to allow the user to identify the kernel when the kernel exists in the server based on the determination. The client manager also collects results when computing of all kernels is completed.

Figure 8:
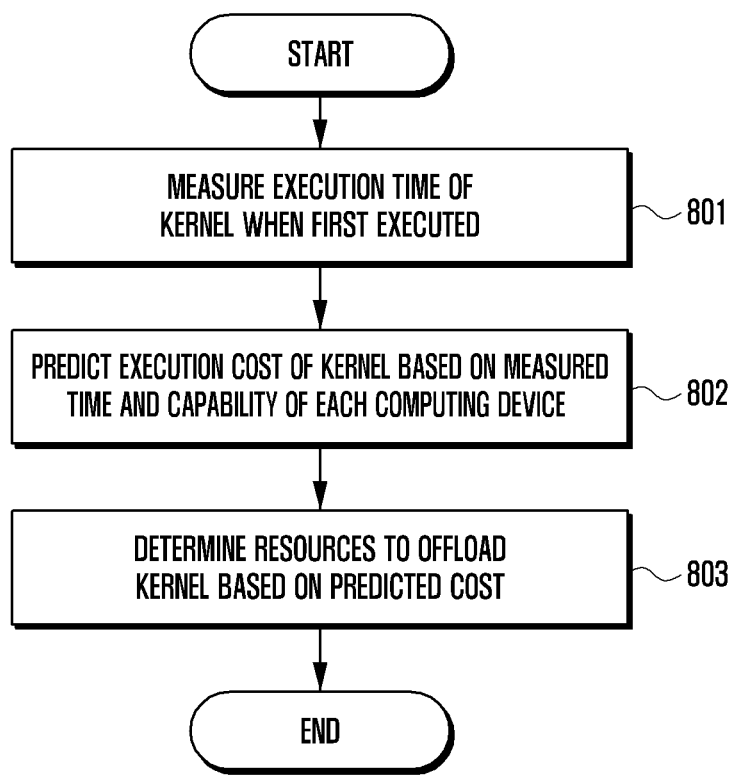
FIG. 8 illustrates an operation for determining a kernel to be offloaded by a client manager of a terminal (local device) according to an embodiment of the present disclosure.

FIG. 8 illustrates an operation for determining a kernel to be offloaded by the client manager of the terminal according to an embodiment of the present disclosure.

More specifically, FIG. 8 illustrates an operation for determining a kernel to be offloaded by the client manager in the automatic offloading mode.

Referring to FIG. 8, when the kernel is first executed, the client manager measures an execution time of the corresponding kernel in step 801. When the corresponding kernel is re-executed at a predetermined time point, the client manager predicts an execution cost of the corresponding kernel based on the measured time and a capability of each computing device, that is, the terminal or the server node in step 802. Each computing device is included in an available computing resource list which the client manager requests and receives from the resource manager. The resource manager receives and stores the availability from the server manager of each server node in advance.

Thereafter, the client manager predicts the execution cost of the corresponding kernel based on at least one of a calculation capability of the local device, a calculation capability of the server node to be allocated, a data transmission time according to a data size and a communication state (bandwidth) used by the kernel, a time for which the kernel to be executed is actually executed by the local device, and energy consumption when the kernels are executed. That is, the client manager analyzes the benefit of when the kernel is transferred by predicting the execution cost.

The client manager selects resources such as the server node to execute the corresponding kernel based on the predicted cost according to the analysis in step 803. Although not illustrated in FIG. 8, the client manager may collect results of the execution performed by each server node.

Figure 9:
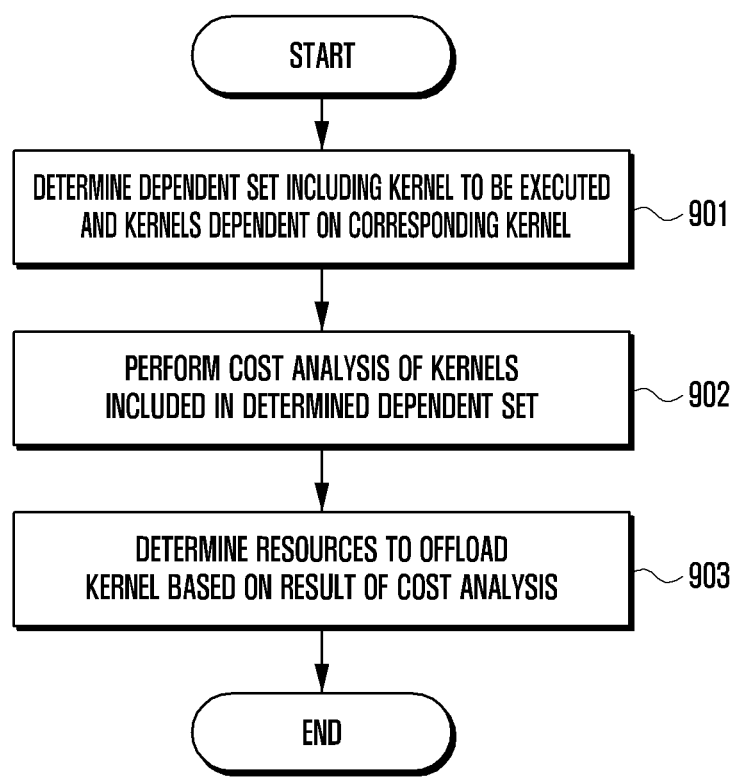
FIG. 9 illustrates an operation for determining a kernel to be offloaded by the client manager of the terminal (local device) when a plurality of kernels having dependency exist according to an embodiment of the present disclosure.

FIG. 9 illustrates an operation for determining a kernel to be offloaded by the client manager of the terminal when a plurality of kernels having dependency exist according to an embodiment of the present disclosure.

More specifically, FIG. 9 illustrates an operation for determining a kernel to be offloaded by the client manager in the automatic offloading mode.

Referring to FIG. 9, the terminal determines an independent kernel to be executed and one or more kernels including all kernels dependent on the independent kernel as a dependent set in step 901.

More specifically, kernel dependency is expressed as data dependency between kernels and one kernel is dependent on several kernels. A communication quantity of dependent data is determined according to a location in which the dependent kernel is executed. Communication for data transmission is not needed when dependent kernels are executed in the same location, but is needed when the dependent kernels are executed in different locations.

The terminal provides all the dependent kernels as one dependent set and stores the dependent set to be used for cost analysis. If the dependent set is generated once, the dependent set is stored in a database (i.e. storage in the terminal) to be used for later cost analysis. In step 901, when one independent kernel is executed, a dependent set including kernels dependent on the same kernel is determined in the database. When the dependent set of the corresponding kernel does not exist, the cost analysis of the corresponding kernel is performed only using the cost model described in FIG. 8.

When the dependent set exists, total cost analysis of the set is performed in step 902. This corresponds to analysis of the cost required for executing each kernel based on the cost model described in FIG. 8 with respect to all the kernels included in the corresponding dependent set. When the dependent set exists, an optimal location in which the corresponding kernel should be executed is analyzed through the total cost analysis of the set.

In step 903, the client manager determines resources to execute each kernel, that is, to offload each kernel based on results of the executed cost analysis.

Although not illustrated in FIG. 9, when it is determined whether to transfer the task through the cost analysis considering the dependency, the client manager may transfer the corresponding kernel to the server or execute the kernel by the local device according to the determination. When the location in which the kernel dependent on the current independent kernel is executed is different from the location in which the current kernel will be executed, the client manager may move dependent data to the location in which the independent kernel is executed. When the user desires to identify a result of the kernel execution, the client manager may move the kernel to the local device to allow the user to identify the kernel when the kernel exists in the server based on the determination. The client manager may also collect results when the computing of all kernels is completed.

Figure 10:
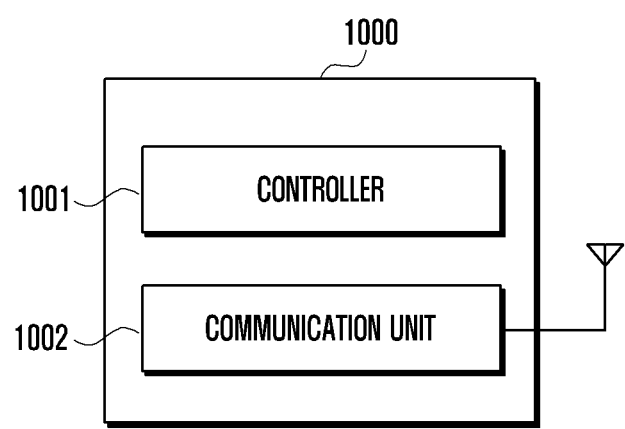
FIG. 10 illustrates a structure of the terminal to which the method of determining whether to perform offloading can be applied according to the present disclosure.

FIG. 10 illustrates a structure of the terminal to which the method of determining whether to perform offloading can be applied according to an embodiment of the present disclosure.

As previously noted, the terminal to which the method of determining whether to perform offloading is applied according to the present disclosure may also be referred to as the local device. Further, the server that receives data and a kernel according to the determination of the offloading, executes the data and the kernel, and then transmits a result thereof to the local device may correspond to an embodiment of the terminal.

Referring to FIG. 10, a terminal 1000 according to the present disclosure includes a controller 1001 and a communication unit 1002.

The communication unit 1002 performs data communication and transmits/receives data and a kernel to perform offloading.

The controller 1001 controls general operations of the terminal. Although it is illustrated in FIG. 10 that the terminal 1000 includes only the controller 1001 and the communication unit 1002, the terminal 1000 may further include a module for performing various functions and a module for determining a kernel to be offloaded or for collecting results of kernel execution. Hereinafter, it is assumed that the controller 1001 controls all the general operations of the terminal.

The controller 1001 receives a resource list for executing the kernel from the server, predicts kernel execution costs of one or more kernel execution resources included in the resource list, and transmits the kernel to the kernel execution resources to execute the kernel according to a result of the prediction.

In the above embodiments, all operations may be optionally performed or may be omitted, and steps in each embodiment do not have to be sequentially performed and orders thereof may be changed. In addition, the embodiments disclosed in the specification and drawings are merely presented to easily describe technical details of the present disclosure and to assist in the understanding of the present disclosure, and are not intended to limit the scope of the present disclosure. That is, it is obvious to those skilled in the art to which the present disclosure belongs that different modifications can be achieved based on the technical spirit of the present disclosure.

Although the present disclosure has been described above using specific terms in connection with the certain embodiments disclosed in the specification and drawings, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

What is claimed is:

1. A method of executing an application program by a terminal, the method comprising:
   receiving, from a server, a resource list including resources to execute a plurality of kernels including a first kernel and at least one second kernel for the application program;
   identifying first cost information associated with a capability of the terminal to execute the first kernel and second cost information associated with a capability of the server to execute the first kernel, based on the resources included in the resource list;

identifying whether the first kernel is dependent on the at least one second kernel which has been executed, based on whether data according to an execution of the at least one second kernel is necessary to execute the first kernel;

identifying the data according to the execution of the at least one second kernel which is to be transmitted between a first location in which the first kernel is to be executed, and a second location in which the at least one second kernel has been executed, based on the resource list, when the first kernel is dependent on the at least one second kernel;

determining the first cost information and the second cost information based on the identified data, when the first location is different from the second location;

selecting a resource to execute the first kernel for the application program between the terminal and the server based on the first cost information and the second cost information; and transmitting the identified data and the first kernel to the server, when the selected resource corresponds to the server and a resource corresponding to the second location is the terminal, wherein identifying the second cost information comprises:

measuring execution time of the first kernel based on information on the capability of the server received from the server; and identifying the second cost information based on a measured time and energy consumed by the terminal when the terminal is in an idle state, and wherein the second cost information is further determined based on the measured time and energy consumed by the terminal according to the identified data.

2. The method of claim 1, wherein the server includes a cloud server capable of executing the first kernel.

3. The method of claim 1, wherein identifying the first cost information further comprises:

measuring time required when the first kernel is executed by the terminal; and identifying the first cost information based on the measured time and energy consumed by the terminal when the first kernel is executed.

4. The method of claim 3, wherein the first cost information is further determined based on the measured time and energy consumed by the terminal according to the identified data.

5. The method of claim 1, further comprising receiving information on a result of the execution of the first kernel from the server.

6. A terminal for executing an application program, the terminal comprising:

a communication unit configured to transmit and receive information; and at least one processor configured to:

control the communication unit to receive, from a server, a resource list including resources to execute a plurality of kernels including a first kernel and at least one second kernel for the application program, identify first cost information associated with a capability of the terminal to execute the first kernel and second cost information associated with a capability of the server to execute the first kernel, based on the resources included in the resource list, identify whether the first kernel is dependent on the at least one second kernel which has been executed, based on whether data according to an execution of the at least one second kernel is necessary to execute the first kernel, identify, when the first kernel is dependent on the at least one second kernel, the data transmitted between a first location in which the first kernel is to be executed and a second location in which the at least one second kernel has been executed based on the resource list, determine, when the first location is different from the second location, the first cost information and the second cost information based on the identified data, select a resource to execute the first kernel for the application program between the terminal and the server based no the first cost information and the second information, and control the communication unit to transmit the identified data and the first kernel to the server, when the selected resource corresponds to the server and a resource corresponding to the second location is the terminal, wherein the at least one processor is further configured to measure execution time of the first kernel based on information on the capability of the server received from the server, identify the second cost information based on a measured time and energy consumed by the terminal when the terminal is in an idle state, and determine the second cost information based on the measured time and energy consumed by the terminal according to the identified data.

7. The terminal of claim 6, wherein the server includes a cloud server capable of executing the first kernel.

8. The terminal of claim 6, wherein the at least one processor is further configured to measure time required when the first kernel is executed by the terminal and identify the first cost information based on the measured time and energy consumed by the terminal when the first kernel is executed.

9. The terminal of claim 8, wherein the at least one processor is further configured to determine the first cost information based on the measured time and energy consumed by the terminal according to the identified data.

10. The terminal of claim 6, wherein the at least one processor is further configured to control the communication unit to receive information on a result of the execution of the first kernel from the server.

* * * * *